United States Patent [19]

Ng et al.

[11] Patent Number: 4,797,802
[45] Date of Patent: Jan. 10, 1989

[54] MULTIPLE PHASE RECTIFIER WITH ACTIVE FILTER FOR REMOVING NOISE IN TRIGGERING SIGNALS AND DIGITAL PHASE SHIFT COMPENSATOR FOR PHASE SHIFTING SIGNAL PASSED THROUGH

[75] Inventors: Chai-Nam Ng; John J. Dhyanchand, both of Rockford, Ill.

[73] Assignee: Sundstrand Corp., Rockford, Ill.

[21] Appl. No.: 128,445

[22] Filed: Dec. 3, 1987

[51] Int. Cl.[4] .................................................. H02M 1/084
[52] U.S. Cl. .................................. 363/87; 363/44; 363/129
[58] Field of Search ........................ 363/44, 81, 87, 88, 363/129

[56] References Cited

U.S. PATENT DOCUMENTS

| | | | |
|---|---|---|---|
| 3,593,105 | 7/1971 | Brohaugh | 363/129 |
| 3,683,262 | 8/1972 | Neuffer et al. | 363/87 |
| 4,050,007 | 9/1977 | Gross et al. | 363/87 |
| 4,307,346 | 12/1981 | Kurosawa et al. | 328/155 |
| 4,317,975 | 3/1982 | Mizukawa et al. | 219/10.49 R |
| 4,326,160 | 4/1982 | Braun | 323/241 |
| 4,347,562 | 8/1982 | Galloway | 363/87 |
| 4,348,718 | 9/1982 | Vollrath | 363/87 |
| 4,385,242 | 5/1983 | Wagener | 363/129 |
| 4,423,520 | 12/1983 | Murayama et al. | 375/95 |
| 4,488,108 | 12/1984 | Treise et al. | 324/73 R |
| 4,492,918 | 1/1985 | Hernandez et al. | 324/83 R |
| 4,499,534 | 2/1985 | Schnetzka et al. | 363/87 |

FOREIGN PATENT DOCUMENTS

| | | | |
|---|---|---|---|
| 17642 | 10/1980 | European Pat. Off. | 363/129 |
| 117020 | 7/1982 | Japan | 363/129 |
| 66672 | 4/1985 | Japan | 363/129 |

*Primary Examiner*—William H. Beha, Jr.
*Attorney, Agent, or Firm*—Antonelli, Terry & Wands

[57] ABSTRACT

An improved converter for converting a multiple phase variable frequency AC voltage having a high degree of noise produced by a variable frequency multiple phase voltage source into a DC voltage is disclosed. Triggering pulses for a full wave recification bridge are generated by a low pass filter which filters an output signal from the multiple phase variable frequency voltage source which introduces a constant phase shift independent of frequency. A rectangular wave form is produced having a frequency synchronized with zero crossing points of the output signal from the filter. A digital phase shift compensator phase shifts the rectangular wave form to produce a timing signal having a fixed phase shift throughout the variable frequency range which compensates for the phase shift introduced by the filter. Switching pulses for switches in a full wave rectification bridge are produced by processing of the resultant timing signal produced by the digital phase shift compensator to produce operation which is not deleteriously affected by the presence of noise in the output signal from the multiple phase voltage source.

7 Claims, 8 Drawing Sheets

MULTIPLE PHASE RECTIFIER WITH ACTIVE FILTER FOR REMOVING NOISE IN TRIGGERING SIGNALS AND DIGITAL PHASE SHIFT COMPENSATOR FOR PHASE SHIFTING SIGNAL PASSED THROUGH

BACKGROUND OF THE INVENTION

1. Field of the Invention

The present invention relates to a converter for converting a variable frequency multiple phase AC voltage source into DC. More specifically, the present invention relates to converters of the aforementioned type in which the multiple phase AC voltage contains substantial noise.

2. Description of the Prior Art

Figure 1:
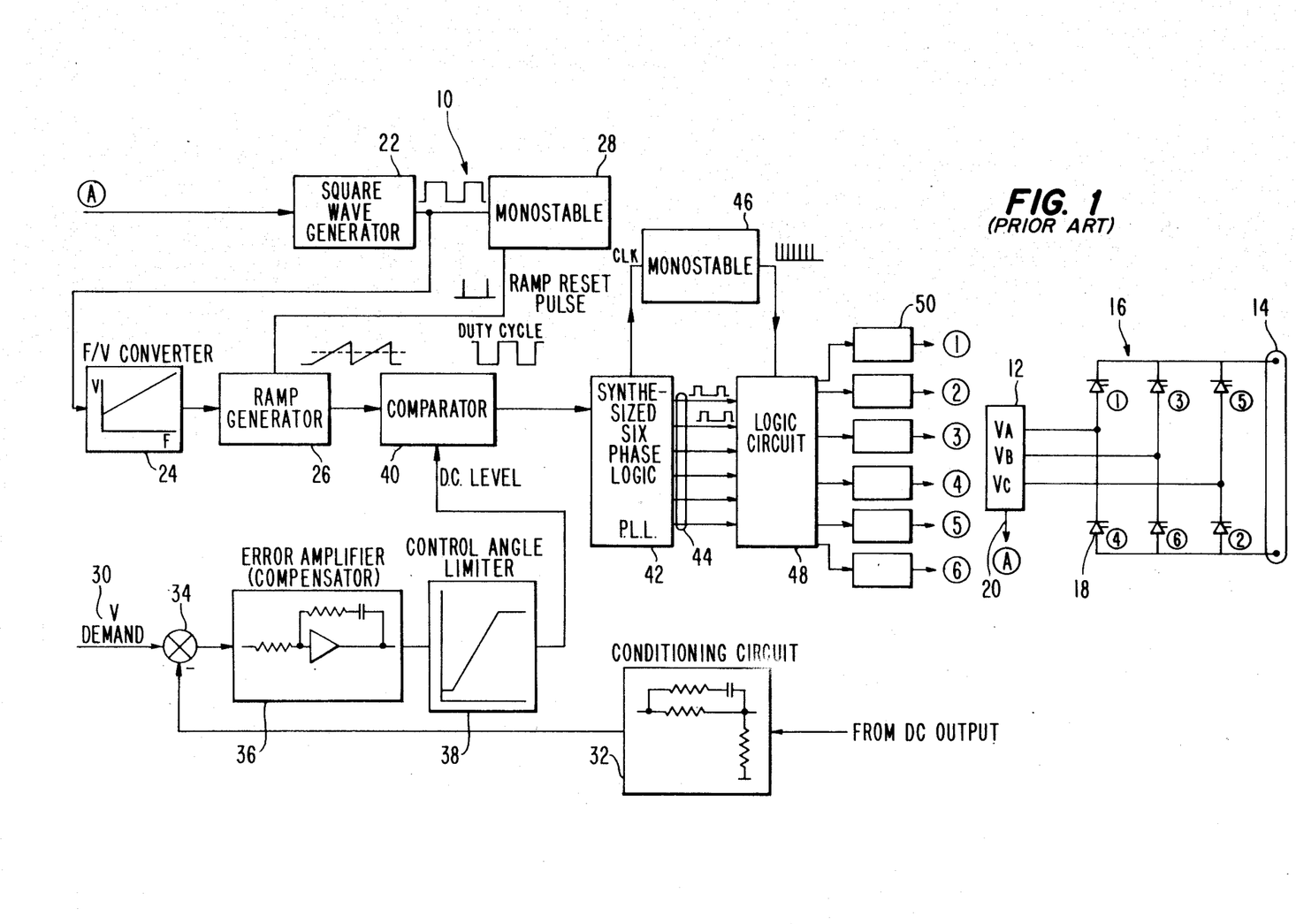
FIG. 1 is a block diagram of the prior art.
Figure 3:
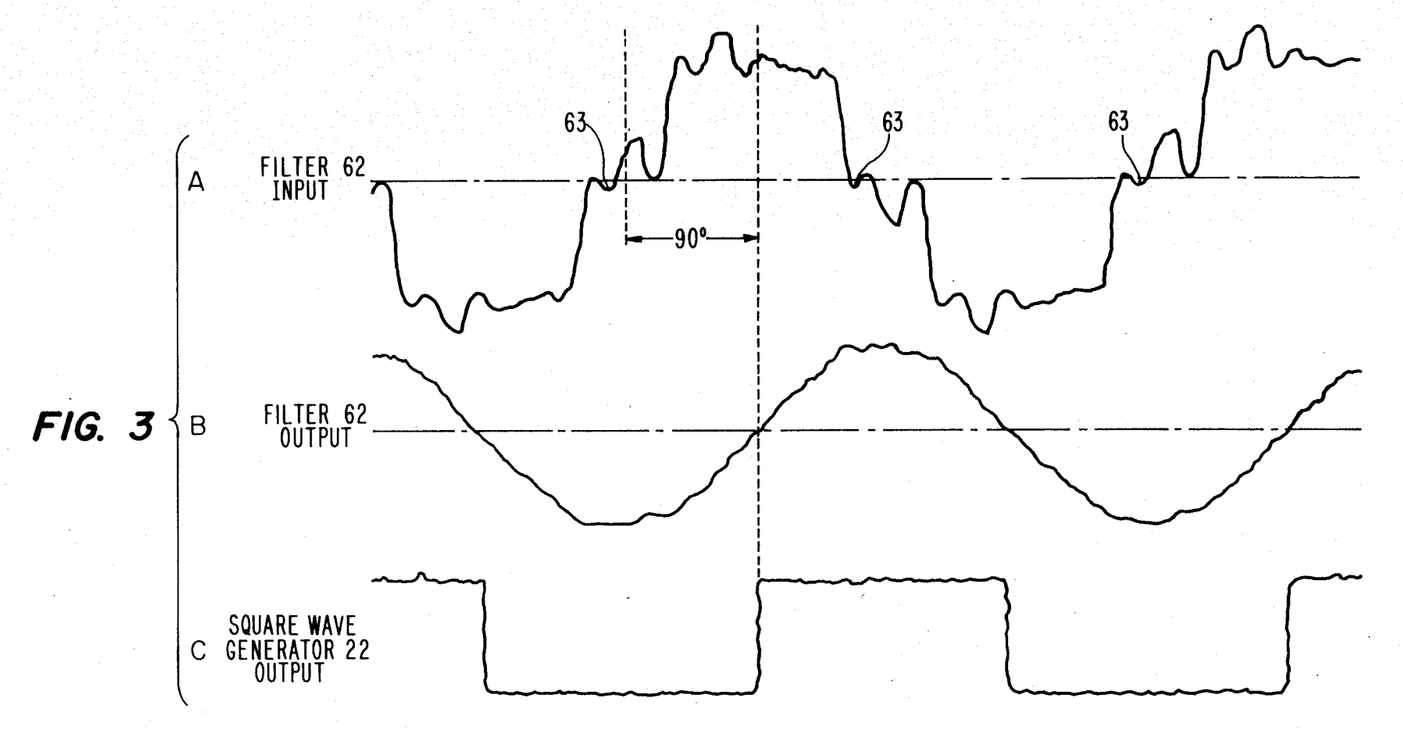
FIGS. 3A-C are oscillograms illustrating various signals in the block diagram of FIG. 2.

FIG. 1 illustrates a prior art converter 10 for converting a multiple phase variable frequency voltage, which may vary in magnitude, produced by a variable frequency multiple phase voltage source 12 producing a three phase output with each phase containing substantial noise (components above the fundamental frequency) into a variable DC output potential on output 14. FIG. 3A illustrates an example of the noisy AC produced by the variable frequency multiple phase voltage source 12. The system is designed for use in systems such as airframes. In this type of system, it is common that harmonics are produced by a multiple phase full wave rectification bridge 16 having six silicon controlled rectifiers 18 which are synchronously switched as is known in the art at the appropriate time during the individual voltage phases $V_A$, $V_B$, and $V_C$ to generate the DC output potential. During operation, each of the silicon controlled rectifiers is switched on for 120° of the cycle of its associated voltage phase with the phase of the switching times controlling variation in amplitude. The presence of imprecise or false zero crossing points 63 as illustrated in FIG. 3A deleteriously affects the generation of properly timed timing signals for controlling the conduction of the SCR's 18. The control of the signals controlling the on times of the individual silicon controlled rectifiers 18 is produced as follows. A phase reference voltage 20 is derived from the multiple phase voltage source 12 which is processed to generate the individual switching signals ①, ②, ③, ④, ⑤, and ⑥ to control the on intervals of the silicon controlled rectifiers 18. As stated above, the reference signal 20 is characterized by having a substantial noise component as illustrated in FIG. 3A including imprecise or false zero crossing points 63. The substantial noise component is produced by a combination of one or more operational factors including harmonics produced by the switching of the individual silicon! controlled rectif.ers 18 to produce the output DC potential which influences the current drawn from the multiple phase voltage source 12, operation in environments such as airframes where the output power being drawn from the multiple phase voltage source 12 is close to the rated maximum output power capacity and the relatively large commutation reactance of the multiple phase voltage source 12. The combination of one or more of the above three signal distorting factors produces individual sinusoidal output phases $V_A$, $V_B$, and $V_C$ having substantial noise. It should be understood that the phase reference signal 20 may be produced by a step down transformer coupled to an individual phase if a neutral is present in the multiple phase voltage source or, alternatively, by a step down transformer coupled across two of the phases if no neutral is present as illustrated in FIG. 1. The presence of substantial noise in the phase reference signal 20 produces substantial problems in generating the correctly phased switching signals for the silicon controlled rectifiers 18 as a consequence of the phase reference signal 20 not having well defined zero crossing points 63 which can cause misfiring of the silicon controlled rectifiers 18 and instability in closed loop control as a result of zero crossing points not being uniquely defined and detectable.

The reference signal 20 is applied to a square wave generator 22 which produces a square wave having changes in level synchronized with the zero crossing points of the reference signal 20. As described above, the presence of imprecise or false zero crossing points in the reference signal 20 causes the square wave generator 22 to produce an output signal having time base instabilities which deleteriously affect operation.

The output of the square wave generator 22 is applied to frequency-to-voltage converter 24 which produces an output DC voltage directly proportional to the input frequency. It should be understood that the multiple phase voltage source 12 is a variable frequency source which causes the output of the square wave generator 22 to vary in time base proportional to the frequency changes of the phase reference signal. The output DC signal from the voltage-to-frequency converter 24 is applied to a ramp generator 26 which produces a sawtooth waveform having a slope proportional to the DC output produced by the frequency-to-voltage converter 24 and a time base synchronized to the zero crossing points of the output signal from the square wave generator 22 by one-shot multivibrator 28.

A variable level DC output potential is produced on the output 14 by the following operation. A voltage demand signal 30 is produced by a conventional voltage level setting control such as a rheostat. The output potential from the output 14 is fed back to a conditioning circuit 32 which produces an output potential proportional to the DC output potential on the output 14. The output signal from the conditioning circuit 32 and the voltage demand signal 30 are summed by summer 34. The output signal from the summer 34 is applied to error amplifier 36 which produces an output signal proportional to the output from the summer 34. A control angle limiter 38 limits the error signal from the error amplifier 36 to produce a DC signal proportional to the difference between the output from the conditioning circuit 32 and the voltage demand signal 30 over the desired range of operation. Comparator 40 produces a rectangular wave output signal which functions as a timing signal for driving a synthesized six phase logic circuit including phase lock loop 42. The duty cycle of the comparator 40 is directly proportional to the time interval during which the sawtooth signal outputted by the ramp generator 26 is above the DC level applied to the comparator by the control angle limiter 38. The timing signal produced by the comparator 40 causes the synthesized six phase logic circuit including phase lock loop 42 to produce a series of output pulses 44 which are each separated by 60° from each other as generally illustrated by the pulses on the top two outputs and further which may contain a duty cycle of 60°. The synthesized six phase logic circuit including phase lock loop 42 contains an oscillator producing a basic frequency which is locked by the phase lock loop to be six times higher than the variable input frequency from the comparator 40. The signal produced by the oscillator is applied to a one-shot multivibrator 46 which produces a series of output pulses which are applied to logic circuit 48. The logic circuit 48 responds to the output pulses from the one-shot multivibrator 46 and synthesized six phase circuit including phase lock loop 42 to produce output signals which are applied to gate drivers 50 which activate the individual SCRs 18. A number appearing to the right of each of the gate drivers 50, which is circled, correlates the gate driver with its associated silicon controlled rectifier 18 which is activated by a high level output signal from the gate driver. In order to produce an output potential from 14, it is necessary that at any point in time at which current is to be outputted that one of the SCRs labelled ①, ③, ⑤ and another of the SCRs labelled ④, ⑥ and ② are simultaneously activated to permit current flow between two of the phases of the three phases of the multiple phase voltage source 12. The switching sequence of the SCRs 18 broken down into six 60° intervals over a full cycle of the voltage outputted by the multiple phase voltage source 12 is with the following sequence of SCRs switched to an on state: 1 and 2, 2 and 3, 3 and 4, 4 and 5, 5 and 6, and 6 and 1. In summary, the prior art of FIG. 1 is adversely affected by the inherent noisy signal produced by the multiple phase voltage source 12 to generate switching signals for the SCR's 18 which do not have the requisite stability.

U.S. Pat. No. 4,347,562 discloses a trigger circuit system for a static converter controlling the firing angles for controlled rectifiers for converting a multiphase constant frequency AC power source into DC.

SUMMARY OF THE INVENTION

The present invention is an improved converter for converting a multiple phase variable frequency AC voltage, which may vary in magnitude, having substantial noise present which is produced by a variable frequency multiple phase voltage source into a DC voltage. With the invention, the switching signals for the switches within a multiple phase full wave rectification bridge are derived from a phase reference signal produced by the variable frequency AC voltage source which is filtered by a low pass filtering circuit which removes noise while introducing a constant phase shift independent of the frequency of the input voltage. A timing signal is derived from the filtered signal for generating the switching signals which is phase shifted by a fixed phase angle throughout the variable frequency range of the variable frequency multiple phase voltage source which compensates for the phase shift introduced by the filter. As a result, the problems present in the prior art as discussed above with reference to FIG. 1 in producing the switching signals for the switches associated with each of the phases of the full wave rectification bridge are overcome. The filtering and phase compensation are implemented by active components which minimizes size and weight. The present invention is highly immune from the effects of system voltage distortion on converter operation. System operation is achieved with a high degree of immunity from the affects of noise as a consequence of the filtering of the reference signal used to generate the control signals for the switches in the full wave rectification bridge with a circuit introducing a constant phase shift independent of frequency and the phase shifting of the timing signal independent of frequency by an amount to compensate for the phase shift introduced by the filter.

A converter for converting a multiple phase variable frequency AC voltage, which may be variable in amplitude, produced by a variable frequency multiple phase voltage source into a DC voltage in accordance with the invention includes a multiple phase full wave rectification bridge having a pair of switches associated with each of the phases with each of the switches having a conductivity controlled by a switching signal, each switch conducting current from one of the phases to an output when the switching signal has a predetermineal polarity and reverting to a blocking state when current drops to zero; a low pass filter, coupled to the multiple phase voltage source, for producing a signal having a frequency equal to the variable frequency of the variable frequency AC voltage source with the signal having a constant phase shift throughout variation in frequency of th voltage source with respect to a signal from the variable frequency multiple phase voltage source; a phase shifter, coupled to the filter, for phase shifting the reference signal by a fixed phase angle throughout the variable frequency range of the voltage source which compensates for the phase shift produced by the filter and producing a timing signal with a fixed phase; and a switching signal generation circuit, responsive to the timing signal, for generating the switching signals of the full wave rectification bridge. The filter is an integrator and the phase shifter is a digital phase shifter. Furthermore, in accordance with the invention, the DC voltage may be varied in magnitude. The variation in magnitude of the DC voltage is produced by an error signal generator, responsive to a specified DC voltage to be produced and to a signal which is a function of a DC voltage being produced, for generating an error signal having a magnitude proportional to te difference between the specified DC voltage and the signal which is a function of the DC voltage being produced; and a comparator, responsive to a sawtooth signal having a frequency equal to the variable frequency of the voltage source and rising from a zero level with a slope directly proportional to the variable frequency and to the error signal for producing an output signal having a duty cycle proportional,to a time period that the sawtooth signal is greater in magnitude than the error signal. Further in accordance with the invention, a square wave generator, responsive to the filter, is provided for producing an output signal changing in level each time the reference signal crosses zero; a frequency-to-voltage converter, coupled to the square wave generator, for producing a signal having a magnitude proportional to the frequency of the output signal from the square wave generator; a pulse generator, coupled to the square wave generator, for producing pulses upon each occurrence of a zero crossing point in the output signal; and, a ramp generator coupled to the frequency-to-voltage generator and to the pulse generator, for producing the sawtooth signal with the sawtooth signal being reset to a low level upon the occurrence of each pulse of the pulse generator. The digital phase shifter includes a phase lock loop having an input from the generator for producing a rectangular wave and an input reference phase signal, a variable frequency oscillator producing an output signal, a multiple stage shift register coupled to the variable frequency oscillator, for dividing an output signal from the oscillator into a signal having a frequency equal to the frequency of the rectangular wave and producing the reference phase signal from one of the stages with the phase lock loop maintaining a fixed phase angle between the rectangular wave and the reference phase signal by varying the frequency of the variable frequency oscillator, the timing signal being produced by on of the stages of the divider. The signal applied to the low pass filter may be derived from an output produced across two of the phases of the multiple phase variable frequency AC voltage source if a neutral is not provided or may be provided from one of the phases of the variable frequency AC voltage source if a neutral is provided.

DESCRIPTION OF THE PREFERRED EMBODIMENTS

Figure 2:
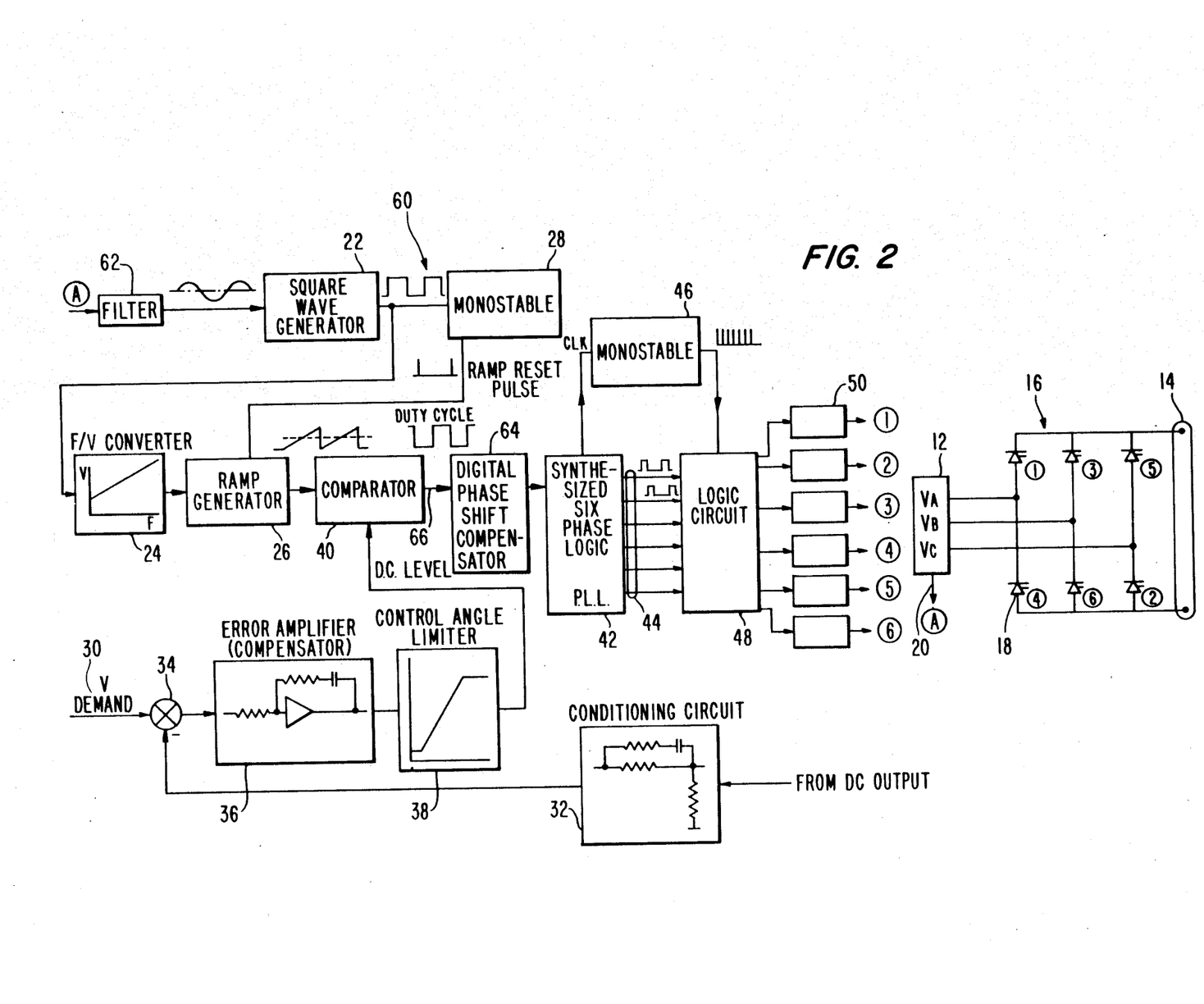
FIG. 2 is a block diagram of an embodiment of the present invention.

FIG. 2 illustrates a block diagram of an embodiment of the present invention. Like reference numerals are used in FIGS. 1 and 2 to identify identical parts. The embodiment of FIG. 2 compensates for the presence of substantial noise in the multiple phases produced by the multiple phase voltage source 12, as illustrated in FIG. 3A, by filtering out the components above the fundamental frequency with an active integration circuit which introduces a constant frequency independent phase shift of a −90° for all of the frequencies in the variable frequency range of signals outputted by the multiple phase voltage source 12. To compensate for the constant −90° phase shift introduced by the filter 62, a digital phase shift compensator 64 applies a predetermined phase shift independent of frequency to the output of the comparator 40 to compensate for the phase shift introduced by the filter 62. The number of degrees of phase compensation introduced by the digital phase shift compensator 64 in the preferred embodiment is 30° but it should be understood that the invention is not limited thereto. A signal equal to $V_A - V_B$ is used as the reference signal 20. As a result, the −90° phase shift introduced by the filter 62 requires a +30° phase shift to bring the +60° relative phase of the reference signal $V_A - V_B$ to 0°. The digital phase shift compensator is implemented by the combination of a phase lock loop, oscillator and shift register as described below with reference to FIG. 4. The input signal to the filter 62, as illustrated in FIG. 3A, contains a substantial amount of noise, including one or more false zero crossing points 63 which would introduce error into the operation of the converter. The output of the filter 62 is illustrated in FIG. 3B which has most of the noise removed to eliminate th occurrence of noise which would introduce false zero crossing points 63 of FIG. 3A which would introduce erroneous operation into the converter. As is indicated by the dotted lines in FIGS. 3A and 3B, a −90° phase shift has been introduced by the filter 62 which occurs independent of the variable frequency of the input signal to the filter because of the implementation in active elements which preferably is with an operation amplifier as illustrated in FIG. 5A. FIG. 3C illustrates the output from the square wave generator 22 which contains transitions in level occurring precisely at the zero crossing points of the filter output. As a consequence of the digital phase shift compensator 64 introducing a compensating constant phase shift independent of frequency, the synthesized six phase logic and phase lock loop circuit 42 has an input timing signal which is properly phased with respect to the true zero crossing points of the reference signal 2 derived from the multiple phase voltage source 12.

Figure 4:
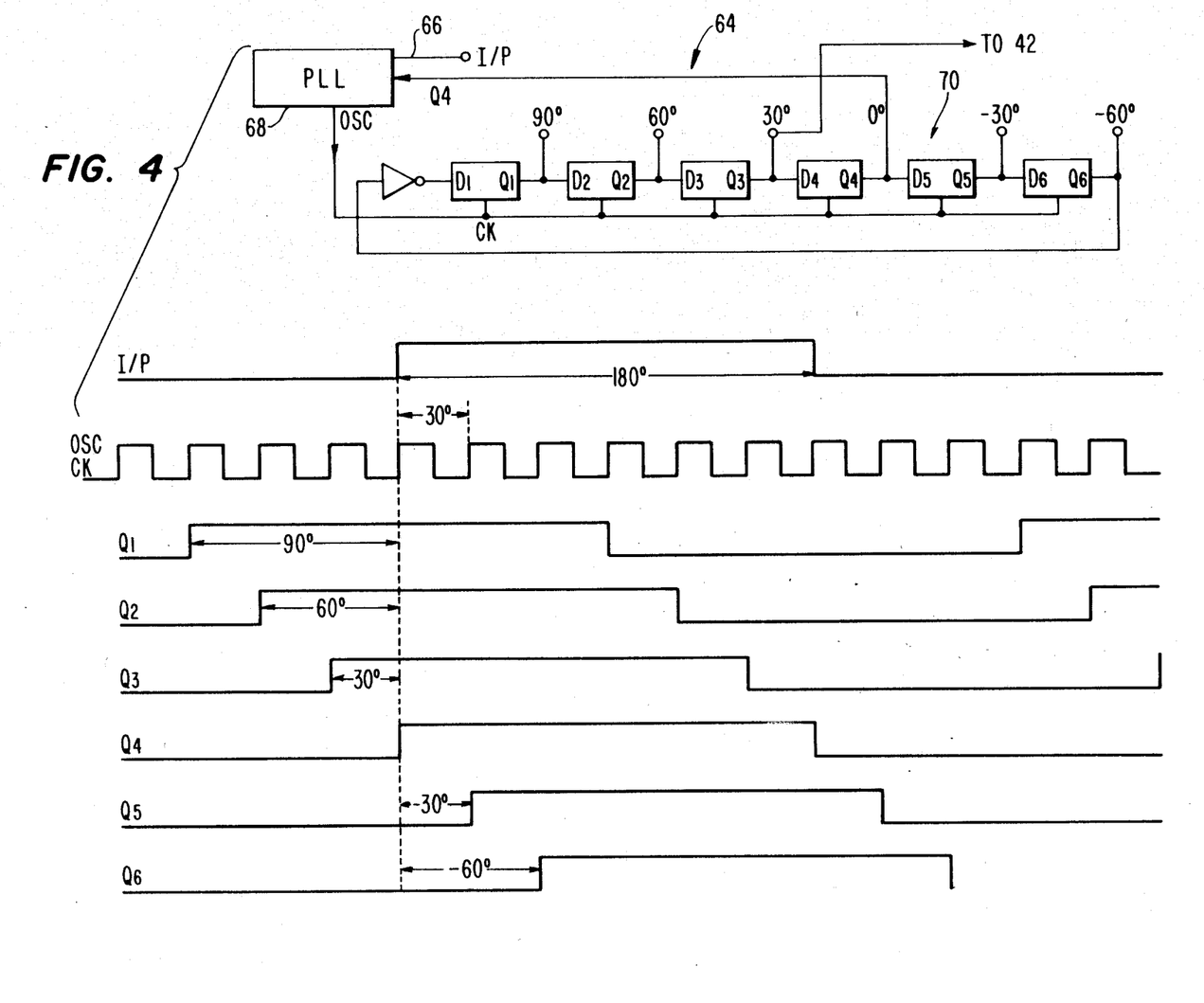
FIG. 4 is a block diagram of the digital phase shift compensator of FIG. 2 and timing diagram of various signals therein.
Figure 5A:
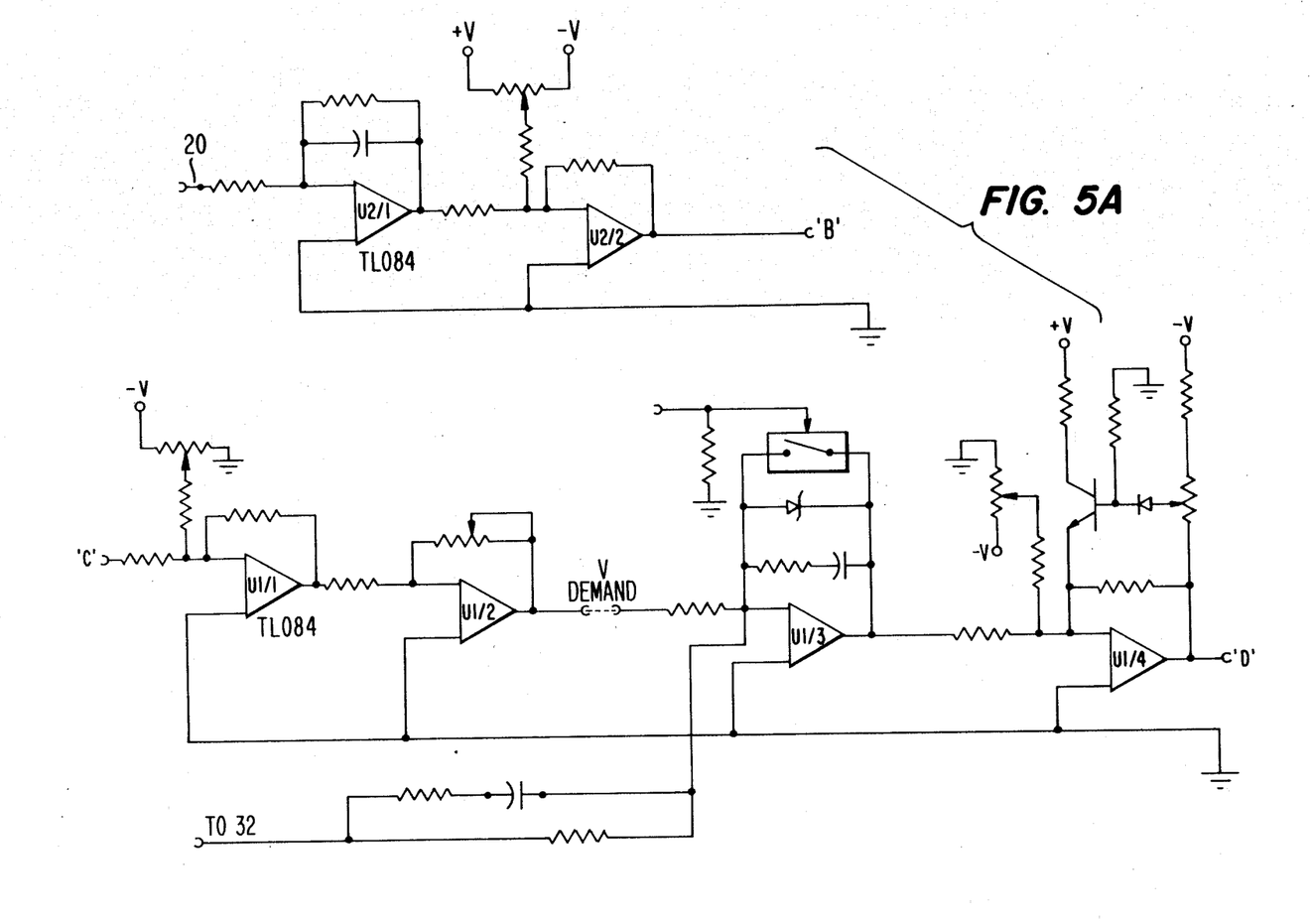
FIGS. 5A-D are a circuit schematic of an embodiment of the present invention.
Figure 5B:
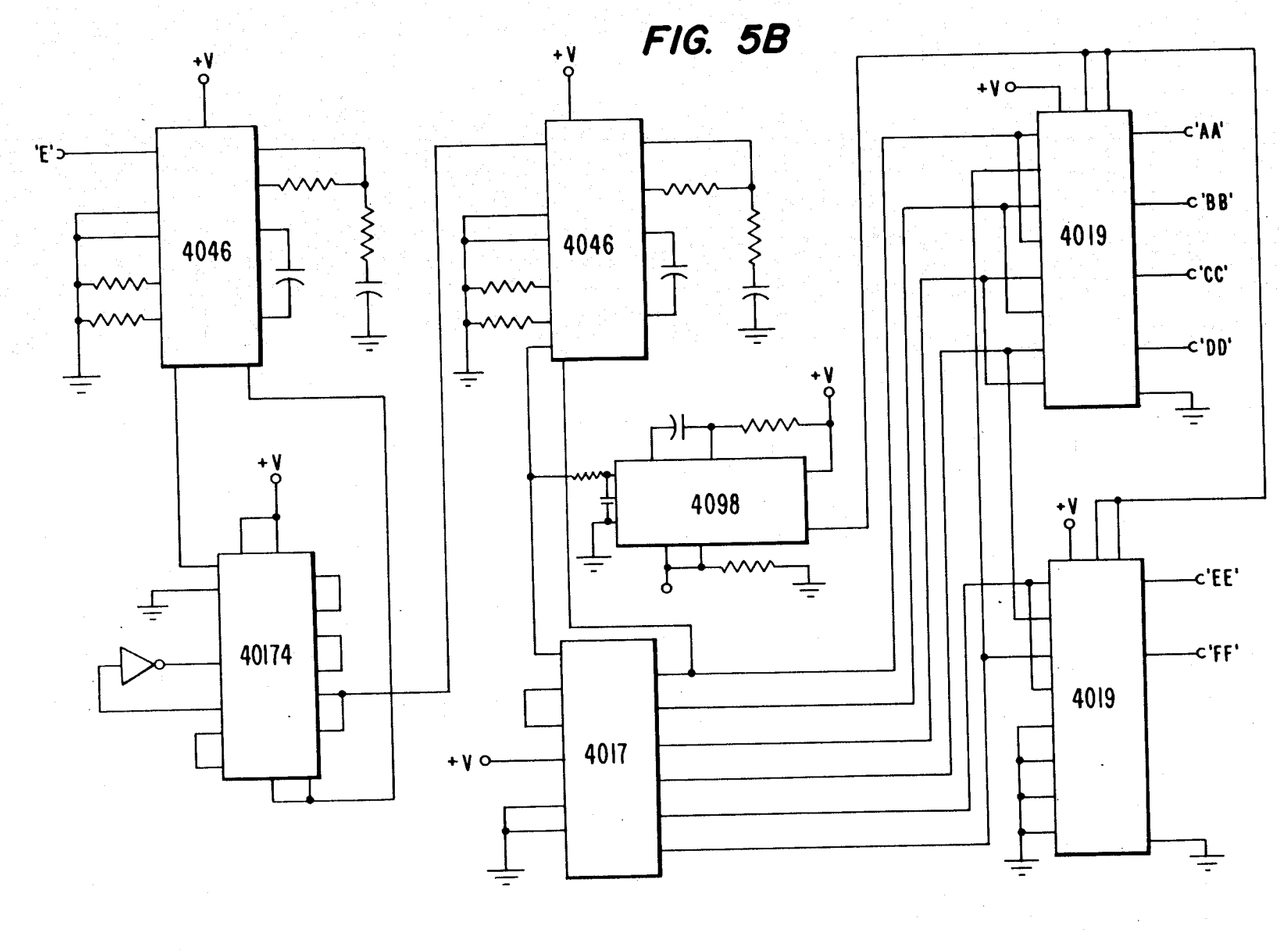
Figure 5C:
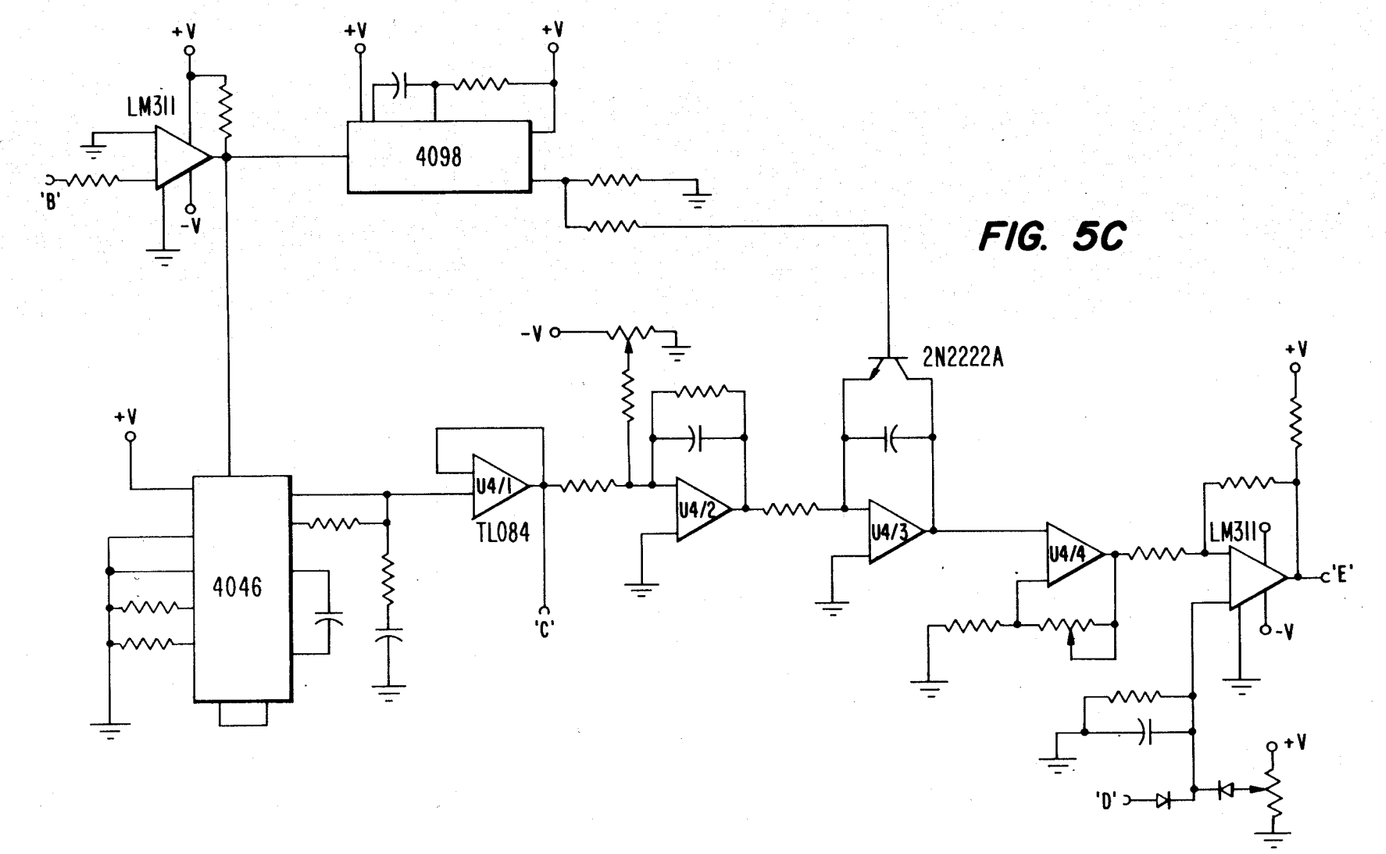
Figure 5D:
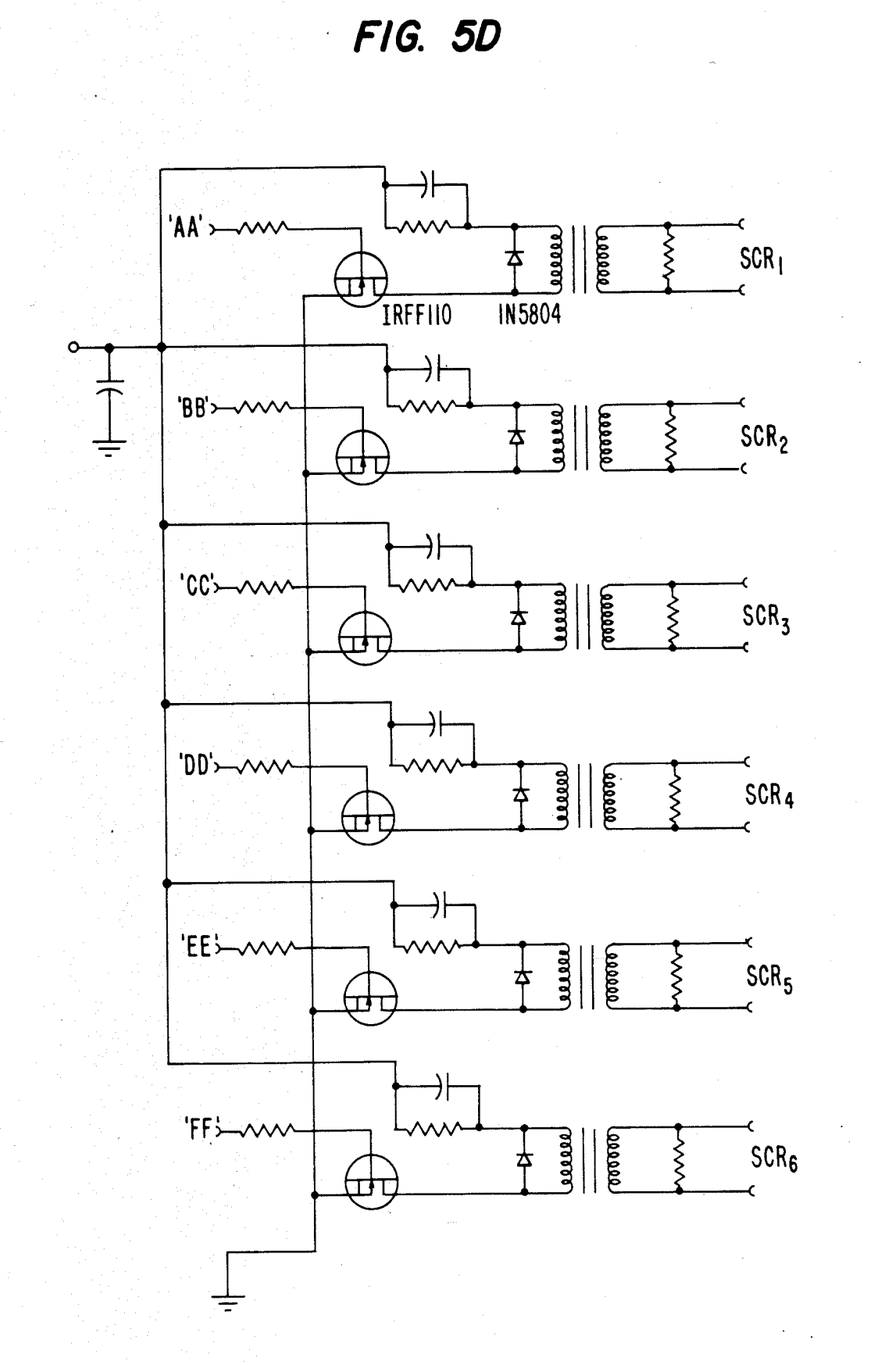

FIG. 4 illustrates a block diagram of the digital phase shift compensator 64 and timing diagram of various signals therein. The digital phase shift compensator 64 receives a rectangular wave input from the comparator 40 on line 66. A phase lock loop 68 maintains a fixed phase relationship between the input signal on line 66 and an output signal from one of the stages of a multistage shift register 70. The phase lock loop 68 contains a variable frequency oscillator having a basic oscillation frequency which is times the basic input frequency of the rectangular wave on line 66 wherein N is equal to the number of stages in the multistage shift register 70. As illustrated, the basic frequency of the oscillator is maintained at six times the basic frequency of the rectangular wave on the line 66 as a consequence of the division by six of the basic frequency by the six stages. FIG. 4 also illustrates a basic timing diagram of the various signal states present in the digital phase shift compensators 64 of FIG. 4. As is apparent from inspection of the timing diagram, each of the individual stages of the shift register $D_1$, $D_2$, $D_3$, $D_4$, $D_5$ an $D_6$ produces a corresponding output $Q_1$, $Q_2$, $Q_3$, $Q_4$, $Q_5$, and $Q_6$ which are phase displaced from each other by 30° with a total 150° of control being possible with the 0° phase relationship with respect to the output signal from the multiple phase voltage source 12 being used to produce the timing signal applied to the synthesized six phase logic and phase lock loop 42. The timing diagram labels each of the signals with its corresponding signal legend contained in the block diagram of FIG. 4. Thus, the output from the first stage of the shift register 70 is labelled with $Q_1$ with other outputs being correspondingly labelled, including the input 66 to the phase lock loop 68 with the legend "I/P" and the oscillator output being labelled "OSC CK".

FIGS. 5A-D illustrate a circuit schematic of a preferred embodiment of the present invention. Integrated circuits are identified by their conventional part notations.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A converter for converting a multiple phase variable frequency AC -voltage produced by a variable frequency multiple phase voltage source into a DC voltage comprising:
   (a) a multiple phase full wave rectification bridge having a pair of switches associated with each of the phases with each of the switches having a conductivity controlled by a switching signal, each switch conducting current from one of the phases to an output when the switching signal has a predetermined polarity and reverting to a blocking state when the flow of current drops to zero;

(b) low pass filtering means, coupled to the multiple phase voltage source, for producing a reference signal having a frequency equal to the variable frequency of the variable frequency AC voltage source with the reference signal having a constant phase shift independent of variation in frequency of the voltage source with respect to a signal from the variable frequency multiple phase voltage source;

(c) means, coupled to the filtering means, for phase shifting the reference signal by a fixed phase throughout the variable frequency range of the variable frequency multiple phase voltage source which compensates for the phase introduced by the low pass filtering means and producing a timing signal with the fixed phase, the means for phase shifting the reference signal comprising a phase shifter responsive to a signal having a frequency identical to the variable frequency AC voltage and producing the timing signal; and (d) switching signal generation means, responsive to the timing signal, for generating the switching signals of the full wave rectification bridge.

2. A converter in accordance with claim 1 wherein:
(a) the filtering means comprises an integrator implemented with an operational amplifier; and
(b) the means for phase shifting the reference signal comprises a digital phase shifter.

3. A converter in accordance with claim 1 further comprising:
means for varying the magnitude of the DC voltage.

4. A converter in accordance with claim 3 wherein the means for varying the magnitude of the DC voltage comprises:
(a) means, responsive to a specified DC voltage to be produced and to a signal which is a function of a DC voltage being produced, for generating an error signal having a magnitude proportional to the difference between the specified DC voltage and the signal which is a function of the DC voltage being produced; and
(b) comparison means, responsive to a sawtooth signal having a frequency equal to the variable frequency and rising from a zero level with a slope directly proportional to the variable frequency and to the error signal, for producing an output signal having a duty cycle proportional to a time period that the sawtooth signal is greater in magnitude than the error signal.

5. A converter in accordance with claim 4 further comprising:
(a) square wave generation means, responsive to the filtering means, for producing an output signal changing in level each time the reference signal crosses zero;
(b) a frequency to voltage converting means, coupled to the square wave generation means, for producing a signal having a magnitude proportional to the rate of occurrence of the output signal from the square wave generator;
(c) pulse generation means, coupled to the square wave generation means, for producing pulses upon each occurrence of a zero crossing point in the output signal for the square wave generator; and
(d) a ramp generator, coupled to the frequency to voltage generating means and to the pulse generation means, for producing the sawtooth signal with the sawtooth signal being reset to a low level upon the occurrence of each pulse of the pulse generation means.

6. A converter in accordance with claim 2 further comprising:
(a) means, coupled to the filtering means, for producing a rectangular wave having levels which change at zero crossing points of the output signal from the filtering means and wherein
(b) the digital phase shifter includes a phase lock loop having an input from the means for producing a rectangular wave and an input from a phase reference signal, a variable frequency oscillator producing an output signal, a multiple stage shift register, coupled to the variable frequency oscillator, for dividing an output signal from the oscillator into a signal having a frequency equal to a frequency of the rectangular wave and producing the phase reference signal from one of the stages, the phase lock loop maintaining a fixed phase between the rectangular wave and the phase reference signal by varying the frequency of the variable frequency oscillator, the timing signal being produced by one of the stages of the divider.

7. A converter in accordance with claim 2 wherein: the AC voltage is variable in amplitude.

* * * * *